(12) United States Patent
Kobayashi et al.

(10) Patent No.: US 7,877,334 B2
(45) Date of Patent: Jan. 25, 2011

(54) RECOGNIZING APPARATUS AND RECOGNIZING METHOD

(75) Inventors: Takumi Kobayashi, Tokyo (JP); Hiroaki Nakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 735 days.

(21) Appl. No.: 11/896,900

(22) Filed: Sep. 6, 2007

(65) Prior Publication Data

US 2008/0077543 A1    Mar. 27, 2008

(30) Foreign Application Priority Data

Sep. 6, 2006  (JP) .............................. 2006-241804

(51) Int. Cl.
G06F 15/18  (2006.01)
(52) U.S. Cl. .............................. 706/12; 706/17; 706/20
(58) Field of Classification Search ..................... 706/12
See application file for complete search history.

(56) References Cited

PUBLICATIONS

Dong et al., Boosting SVM Classifiers By Ensemble, ACM 1-59593-051-5/05/0005, pp. 1072 and 1073, May 2005.*
Wu et al., Coformal Transformation of Kernel Functions: A Data-Dependent Way to Improve Support Vector Machine Classifiers, Neural Processing Letters 15: pp. 59-67, 2002.*
Schapire, R. E. et al., "Improved Boosting Algorithms Using Confidence-Rated Predictions," Machine Learning, vol. 37, No. 3, pp. 1-40, (1999).
Torralba, A. et al., "Sharing Features: Efficient Boosting Procedures for Multiclass Object Detection," In Proc. IEEE Conference on Computer Vision and Pattern Recognition, pp. 762-769, (2004).
Chen, L. F. et al., "A New LDA-Based Face Recognition System Which can Solve The Small Sample Size Problem," Pattern Recognition, vol. 33, pp. 1713-1726, (2000).
Burges, C. J. C., "A Tutorial on Support Vector Machines for Pattern Recognition," Data Mining and Knowledge Discovery, vol. 2, pp. 121-167, (1998).
Freund, Y. et al., "A Decision-Theoretic Generalization of On-Line Learning and an Application to Boosting," Journal of Computer and System Sciences, vol. 55, Article No. SS971504, pp. 119-139, (1997).
Notification of Reasons for Refusal issued by the Japanese Patent Office on Aug. 26, 2008, for Japanese Patent Application No. 2006-241804, and abridged English-language translation thereof.
Morooka et al., "Face Detection by Generating and Selecting Features Based on Kullback-Leibler Divergence," The IEICE Transactions on Information and Systems (2006), J89-D:530-540.

* cited by examiner

*Primary Examiner*—Donald Sparks
*Assistant Examiner*—Nathan H Brown, Jr.
(74) *Attorney, Agent, or Firm*—Finnegan, Henderson, Farabow, Garrett & Dunner, L.L.P.

(57) ABSTRACT

A recognizing apparatus includes a training vector input unit configured to enter training vectors for training, a weak classifier generator configured to obtain weak classifiers based on the value of an element of a dimension common to the training vectors using a learning method, a classifier integrator configured to obtain non-linear mappings for each dimension of the training vectors by combining the weak classifiers, a test vector input unit configured to input a test vector to be classified, a non-linear transformer configured to a transformed vector by transforming the values of the elements of the test vector using the respective non-linear mappings, and a score calculator configured to obtain a classification score by summing the value of the respective elements of the transformed vector and recognize the test vector using the classification score.

7 Claims, 6 Drawing Sheets

RECOGNIZING APPARATUS AND RECOGNIZING METHOD

CROSS-REFERENCE TO RELATED APPLICATIONS

This application is based upon and claims the benefit of priority from the prior Japanese Patent Application No. 2006-241804, filed on Sep. 6, 2006; the entire contents of which are incorporated herein by reference.

TECHNICAL FIELD

The present invention relates to a recognizing apparatus configured to recognize feature vectors and a method thereof.

BACKGROUND OF THE INVENTION

In recent years, importance of security is increased, and an automatic recognizing apparatus such as face recognition or finger print recognition is now becoming widespread. From the viewpoints of ease and safety of people, automatic recognition for various objects (pedestrians or vehicles in the periphery) using a sensor mounted to a vehicle for preventing traffic accidents now attracts the public attention.

In such recognition, an automatic recognition system is achieved from different types of input sensor information by eventually recognizing patterns thereof. In general, the term "patterns" takes the form of "feature vectors" obtained by extracting the features from the input sensor information.

Various multi-variable analyses may be employed in classification of the vectors, and are generally classified into linear classification and non-linear classification. The term "linear classification" indicates classification achieved by applying linear transformation to an entered vector, and the term "non-linear classification" indicates classification achieved by applying non-linear transformation to the vector.

Regarding the linear classification, learning methods employing various statistical methods have been proposed, such as linear discriminant analysis described in L. Chen, H. Liao, M. Ko, J. Lin, and G. Yu, "Anew LDA-based face recognition system which can solve the small sample size problem," Pattern Recognition, Vol. 33, No. 10, pp. 1713-1726, 2000 and a Support Vector Machine (SVM) described in Christopher J. C Burges, "A Tutorial on Support Vector Machines for Pattern Recognition", Data Mining and Knowledge Discovery, Vol. 2, No. 2, pp. 121-167, 1988, incorporated by reference.

On the other hand, in the case of the non-linear classification, there are a few effective learning methods since the non-linear transformation cannot be obtained easily. However, Kernel SVM using Kernel method disclosed in "A Tutorial on Support Vector Machines for Pattern Recognition" and Boosting (AdaBoost, Real AdaBoost, Joint Boosting) have produced good results. Boosting includes a plurality of weak classifiers disclosed in Y. Freund and R. E. Schapire, "A decision-theoretic generalization of on-line learning and an application to boosting," Journal of Computer and System Sciences 55(1), 1997, R. Schapire and Y. Singer, "Improved Boosting Algorithms using confidence-rated predictions," Machine Learning, Vol. 37, No. 3, 1999, and A Torralba, K Murphy and W Freeman, "Sharing Features: efficient boosting procedures for multiclass object detection," In Proc. IEEE Conference on Computer Vision and Pattern Recognition, 2004. In Kernel SVM, the non-linear transformation is performed by replacing the inner product of the vectors by Kernel function, and the non-linear property is expressed by effectively combining the weak classifiers.

The classifiers in the related art as described above have advantages and disadvantages as described below.

Since most of the linear classifiers employ an inner product of the vectors, a calculation cost required for classification is low. However, they have a limit that these classifiers are effective only when the distribution of the target vectors is linearly separable. Therefore, they cannot be effective classifiers for the non-linear distributions.

On the other hand, the non-linear classifiers represented by Kernel SVM or Boosting are effective for most of non-linear distributions. However, since calculation of Kernel function and calculation of the weak classifiers are required by number of times in Kernel SVM and in Boosting respectively, the calculation cost is significantly increased.

For example, in video surveillance applications, hardware resources which can process a large amount of calculation, such as a personal computer (PC) or equivalent apparatuses, may be utilized for executing the applications. Therefore, the classifiers such as Kernel SVM or Boosting which has a high classification performance but also requires high calculation cost may be utilized in the above applications.

However, in view of general application, the recognizing apparatus to be mounted to vehicles for example, the hardware which can be installed is limited to the small one having a performance lower than personal computers.

In the environment such as the above-described video surveillance, if the implementation with low-performance hardware is possible, the cost may be reduced correspondingly.

Therefore, it is desirable to use a classifier with low calculation cost. However, in the case of the linear classifier, although the low calculation cost may be achieved, the constraint of "linear" may result in significantly insufficient classification performance.

BRIEF SUMMARY OF THE INVENTION

Accordingly, it is an object of the present invention is to provide a non-linear recognizing apparatus which configures a non-linear classification plane having a high classification performance at a calculation cost of the same level as a linear classifier.

According to embodiments of the invention, a recognizing apparatus includes a training vector input unit configured to enter a plurality of training vectors as feature vectors for training; a weak classifier generator configured to obtain a plurality of weak classifiers based on the value of an element of a dimension common to the plurality of training vectors using a learning method of Boosting, the plurality of weak classifiers each classifying the plurality of training vectors based on an element of each dimension of the plurality of training vectors; a classifier integrator configured to obtain non-linear mappings for each dimension of the plurality of training vectors by combining the plurality of weak classifiers; a test vector input unit configured to input a test vector to be classified; a non-linear transformer configured to obtain a transformed vector by transforming the values of the elements of the test vector using the respective non-linear mapping corresponding to the dimension of the element; and a score calculator configured to obtain a classification score by summing the value of the respective elements of the transformed vector and recognize the test vector using the classification store.

According to the embodiments of the invention, the non-linear distribution may be recognized in a calculation cost equivalent to that of the linear classifier.

DETAILED DESCRIPTION OF THE INVENTION

Referring now to FIG. 1 to FIG. 7, a non-linear classifier 10 and a learner 15 according to an embodiment of the invention will be described.

Figure 1:
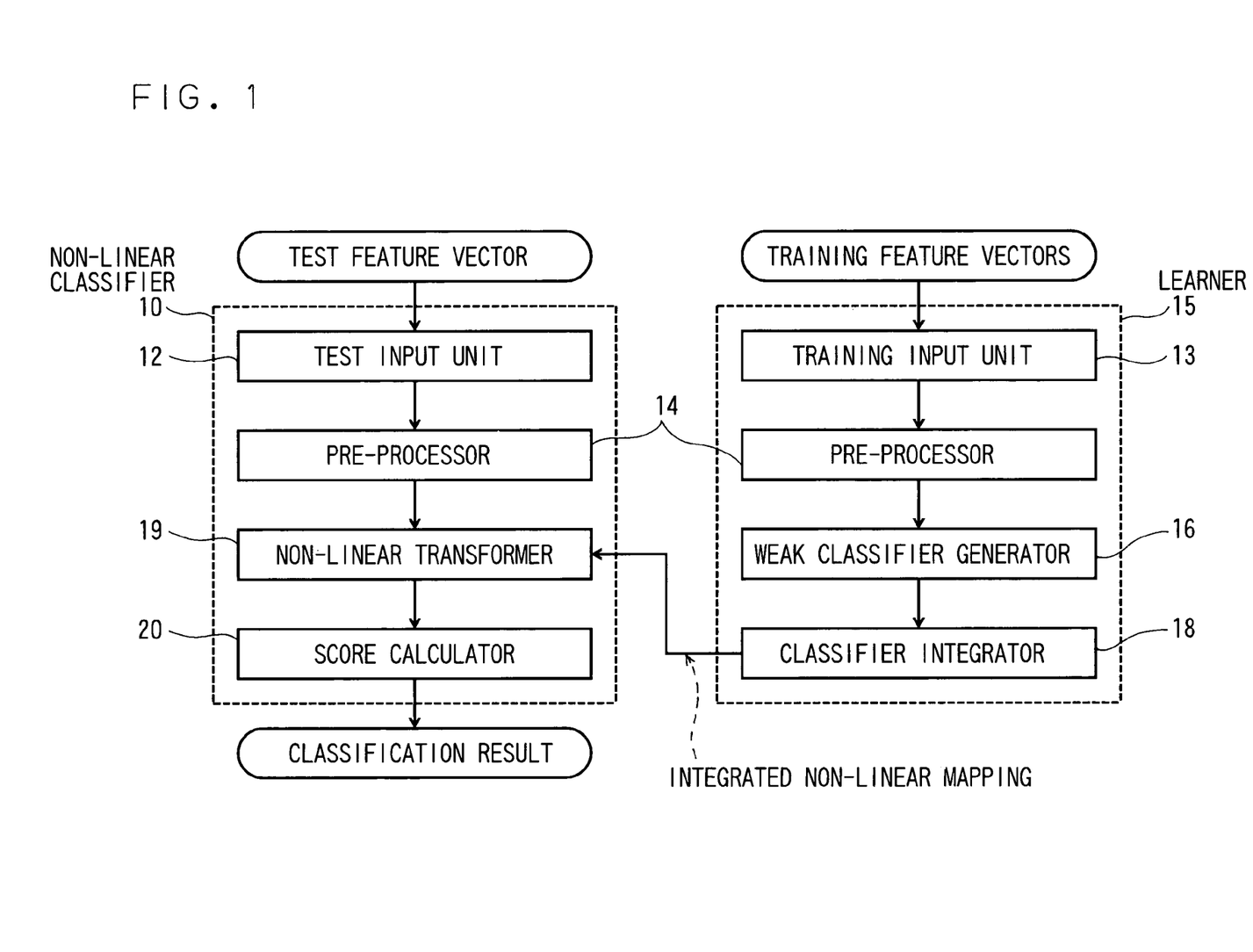
FIG. 1 is a drawing showing a configuration of a non-linear classifier according to an embodiment of the invention.

FIG. 1 is a drawing showing a configuration of the non-linear classifier 10 accompanied with the learner 15 according to this embodiment.

As shown in FIG. 1, the non-linear classifier 10 includes a test feature vector (hereinafter referred to as "test vector") which is to be classified in an application which employs the invention, a test input unit 12 for entering a test vector, a pre-processor 14, non-linear transformer 19 and a score calculator 20 for non-linear classification.

Figure 8:
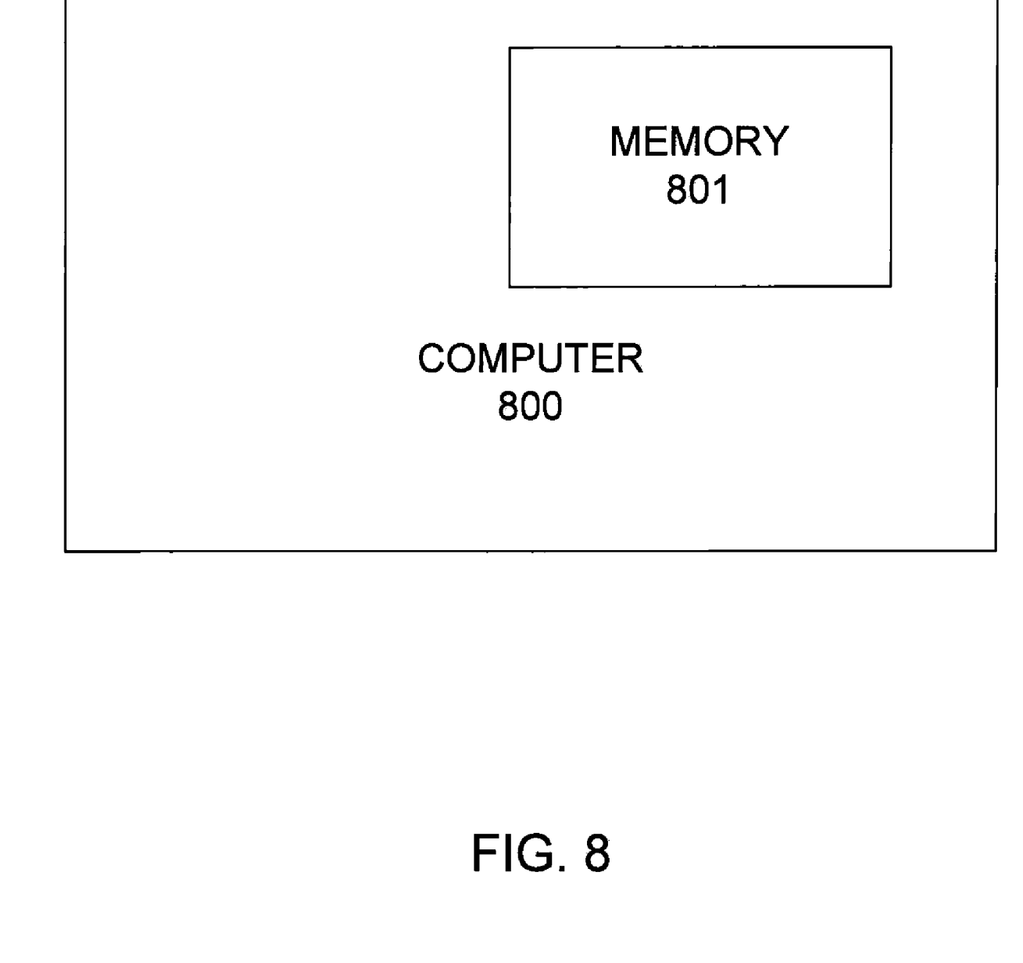
Fig. 8 is a block diagram showing a computer having a memory, consistent with embodiments of the invention.

The learner 15 includes a training vector input unit 13 for entering training feature vectors (hereinafter, referred simply to as "training vectors"), a pre-processor 14 which is identical to the above one, a weak classifier generator 16 to obtain a plurality of weak classifiers and a classifier integrator 18 for non-linear mapping. Functions of the respective components 12 to 20 may be implemented by a software program stored in a memory 801 in a computer 800, as shown in FIG. 8.

(1) Learning Method in Learner 15

Referring now to FIG. 1, a learning method in the learner 15 will be described.

(1-1) Training Vector Input Unit 13

Following data is supplied to the training vector input unit 13 as training vectors.

$$(x_1, y_1), \ldots, (x_N, y_N)$$

$$x \in R^d, y = \{+1, -1\}$$

where N denotes the number of training vectors, x denotes a d-dimensional training vector, and y denotes a teacher label following thereto. In this embodiment, the teacher label has two classes of $\{+1, -1\}$ for simplicity.

(1-2) Pre-Processor 14

Since the pre-processor 14 is operated in two ways; where the pre-process is performed and where the pre-process is not performed, description will be given separately.

(1-2-1) When the Pre-Process is Performed

Firstly, a case in which the pre-process is performed in the pre-processor 14 will be described.

The pre-processor 14 transforms the training vector x by using a statistical method.

For example, when principal component analysis is performed, principal component axes are obtained from the training vector x by solving an eigenvalue problem shown below.

$$XX^t A = A\Lambda$$

$$X = [x_1 - \bar{x}, \ldots, x_N - \bar{x}]$$

$$\bar{x} = \frac{1}{N} \sum_{j=1}^{N} x_j$$

where A denotes a matrix of eigen vectors (principal component axes), and $\Lambda$ denotes eigenvalues. The training vector x is transformed by using A learned in this manner.

$$\tilde{x} = A^t x$$

That is, the training vector will be expressed by:

$$(\tilde{x}_1, y_1), \ldots, (\tilde{x}_N, y_N)$$

$$\tilde{x} \in R^d, y = \{+1, -1\}$$

It is also the same in other statistical methods, for example, in an independent component analysis. In this case, the dimension of the vector is still "d" because the principal component analysis is exemplified. However, the following process may also be applied even when the dimension is different from "d" after transformation through the employment of the statistical method.

(1-2-2) When the Pre-Process is not Performed

On the other hand, it is also possible not to perform any process as the pre-process, that is, not to perform the pre-process. In this case, $$\tilde{x} = x$$

is satisfied.

(1-2-3) Comparison Between Both Operations As described above, there are two types of pre-processes; one is a case in which the statistical method is performed, and the other one is a case in which the process is not performed.

When the pre-process is performed, the independency of the respective vector elements is enhanced through transformation. Therefore, the non-linear mappings of the respective vector elements may be effectively learned in the learner 16 through following Boosting in terms of increasing classification performance.

However, since the pre-processor 14 is used also in the pre-process in the classifier 20, the statistical process is performed as the pre-process, and hence the calculation cost required for classification is slightly increased correspondingly. Therefore, when the pre-process is not performed, the calculation cost is still low.

(1-3) Main Functions of Learner 15

A weak classifier generator 16 and a classifier integrator 18 learn the non-linear mapping of the respective vector elements by applying the Boosting learning method to the training vectors.

The example in which AdaBoost in "A decision-theoretic generalization of on-line learning and an application to boosting" is used will be described.

(1-3-1) Weak Classifier generator 16

In this embodiment, the following classification function is given as the weak classifier.

$$W[L, U, s, i](\tilde{x}) = \begin{cases} +1 & L \leq s \times \tilde{x}\langle i \rangle < U \\ -1 & \text{otherwise} \end{cases} \quad (1)$$

where $L \in R$ and $U \in R$ denote a lower limit and an upper limit respectively, $s \in \{-1, +1\}$ is a sign for adjusting the direction of the inequality signs, $i \in \{1, \ldots d\}$ denotes element numbers of the vector $\tilde{x}$, and $\tilde{x}\langle i \rangle$ denotes $i^{th}$ element of the vector $\tilde{x}$.

Figure 2:
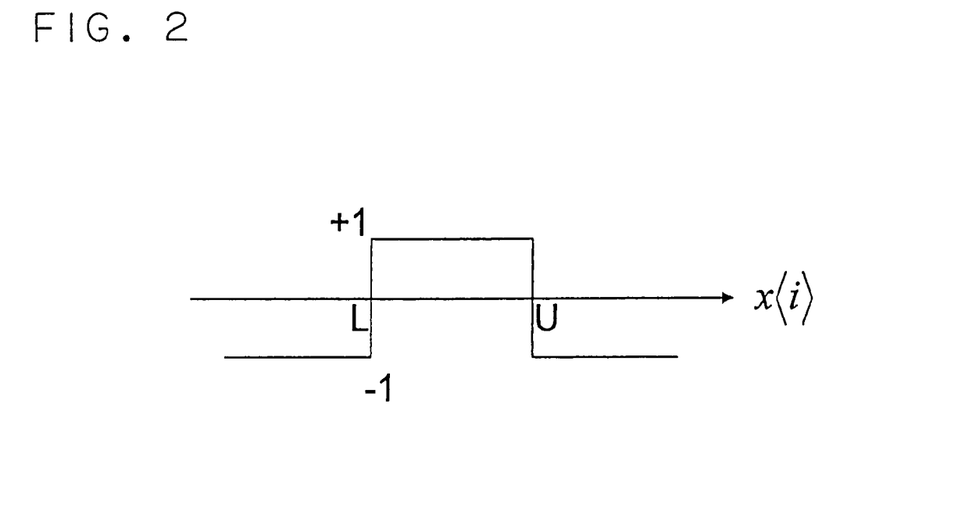
FIG. 2 is a pattern diagram of a weak classifier used in AdaBoost.
Figure 3:
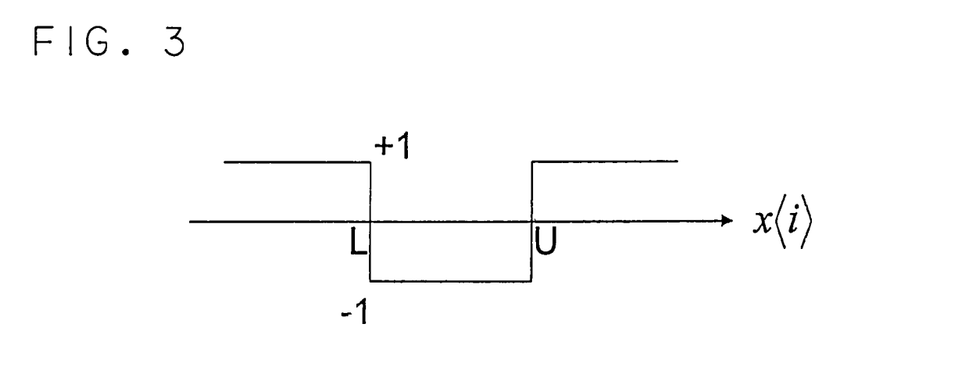
FIG. 3 is a pattern diagram of a weak classifier used in AdaBoost.

The weak classifier is configured to return +1 when s=+1 is established and the value of the vector elements $\tilde{x}(i)$ exists between a lower limit value L and an upper limit value U, which is expressed as in FIG. 2. When s=−1 is established, the classifier is operated in reverse, which is expressed as in FIG. 3.

(1-3-2) Classifier Integrator 18

The final classifier of AdaBoost is the weighted sum of the weak classifiers, and hence the expression:

$$h(\tilde{x}) = \text{sign}\left[\sum_{t=1}^{T} \alpha_t W[L_t, U_t, s_t, i_t](\tilde{x})\right] \quad (2)$$

$$= \text{sign}\left[\sum_{i=1}^{d} \sum_{\{t|i_t=i\}} \alpha_t W[L_t, U_t, s_t, i_t](\tilde{x})\right]$$

is established, where T is the number of repeats of AdaBoost learning, and α is weight to be applied to the respective weak classifiers, $\{t|i_t=i\}$ is a set of "t"s which satisfy the expression $i_t=i$ from among the values of t, where t={1, ..., T}. Note that the weighted sum does not depend on T, but depends on dimension d of the vector in the second row of the expression (2). The sum of the weak classifiers of the dimension d may be expressed as a non-linear mapping $\phi_i$ as shown in:

$$\phi_i(\tilde{x}\langle i \rangle) = \sum_{\{t|i_t=i\}} \alpha_t W[L_t, U_t, s_t, i_t](\tilde{x}) \quad (3)$$

(1-3-3) Obtaining a Table Function for the Non-Linear Mapping

Actually, the non-linear mapping $\phi_i$ can be implemented as a table function.

The table function (hereinafter, referred simply to as "table") will be obtained by the following procedure.

Figure 4:
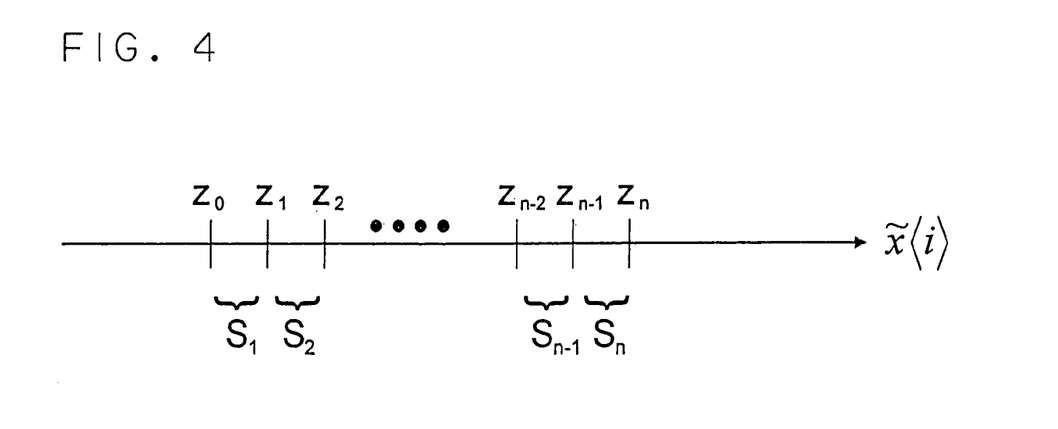
FIG. 4 is a pattern diagram of a range division of a range of value of the vector element.

Firstly, when the range of value $\tilde{x}\langle i \rangle$ is divided into n ranges (bin), as shown in FIG. 4, the expression:

$$\text{Domain }(\tilde{x}\langle i \rangle) = S_1 \oplus \ldots \oplus S_n \quad (4)$$

$$S_j = \{z | z_{j-1} \leq z < z_j\} \quad j = 1, \ldots, n$$

$$z_j = z_{j-1} + \Delta z$$

where $\Delta z$ is the width of bin, is established.

Since the weak classifier in Equation (1) is considered for the divided range, the value of L, U in Equation (1) takes any one of value of $z_0 \ldots z_n$. Therefore, the classifier may be expressed without approximating the value, and hence deterioration of the accuracy of the classifier by dividing the range may be prevented. Accordingly, the non-linear mapping $\phi_i$ is obtained by calculating the expression:

$$\phi_i[j] = \sum_{\{t|i_t=i\}} \alpha_t W[L_t, U_t, s_t, i_t](z_j) \quad (5)$$

for the respective bins $(z_0, \ldots, z_n)$ in advance and preparing the calculated results as the table $\phi_i$.

Figure 5:
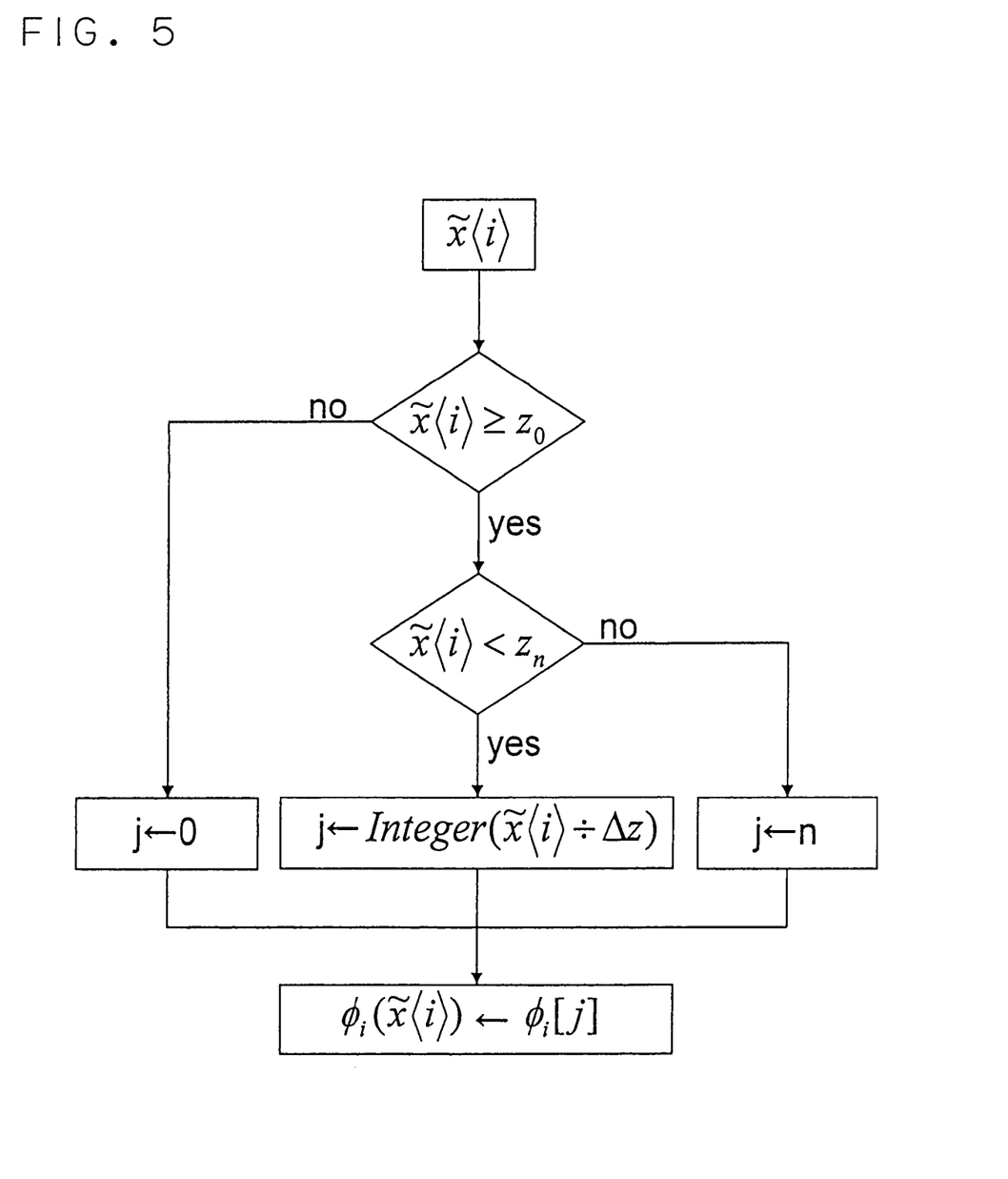
FIG. 5 is a flowchart of a table reference for calculating a non-linear mapping.

The flow of calculation of the non-linear mapping $\phi_i(\tilde{x}\langle i \rangle)$ from $\tilde{x}\langle i \rangle$ will be as shown in FIG. 5.

A key of the table $\phi i[j]$, that is, "j" is obtained by calculating a corresponding value $z_j$ from the value of $\tilde{x}\langle i \rangle$.

Subsequently, assuming that one of the elements of the set $\{t|i_t=i\}$ is t1, $\alpha_{t1} W[L_{t1}, U_{t1}, s_{t1}, i_{t1}]$ is one of the weak classifiers added on the right side of Equation (5), that is, the components of the non-linear mapping $\phi_i$. The component $\alpha_{t1} W[L_{t1}, U_{t1}, s_{t1}, i_{t1}]$ is shown as the first weak classifier 601 in FIG. 6.

Figure 6:
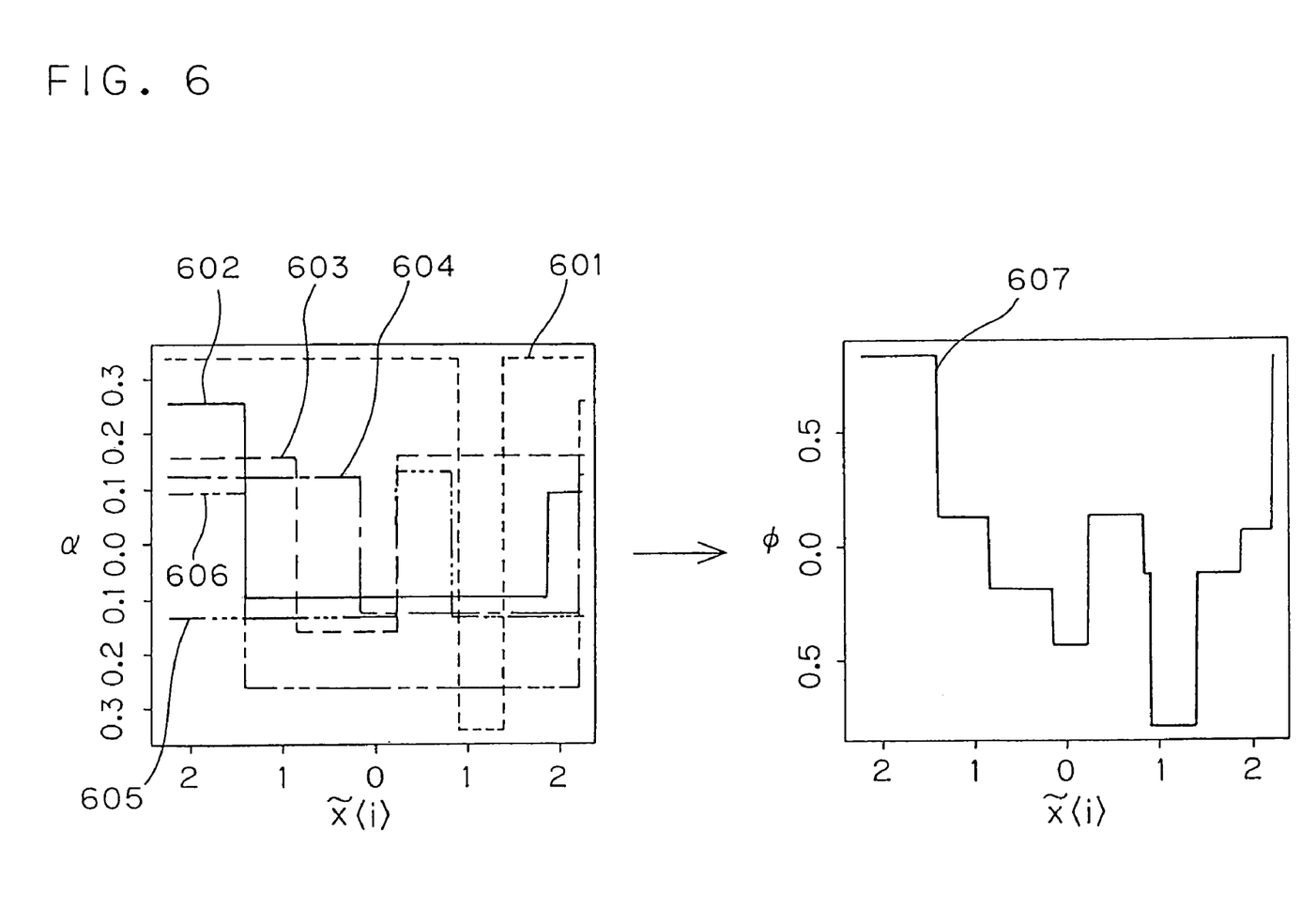
FIG. 6 is a pattern diagram of a non-linear mapping function by the superposition of the weak classifiers.

Here, for example, it is assumed that there are six elements in the set $\{t|i_t=i\}$, which are t1, t2, t3, t4, t5 and t6 and expressed as the first weak classifier 601, a second weak classifier 602, a third weak classifier 603, a fourth weak classifier 604, a fifth weak classifier 605, and a sixth weak classifier 606 shown on the left side in FIG. 6, they are expressed as a table according to the different lower limit value L, the upper limit value U and weights a depending on the respective weak classifiers. The non-linear mapping $\phi_i(\tilde{x}\langle i \rangle)$ by the superposition of the weak classifiers is the sum of the first weak classifier 601, the second weak classifier 602, the third weak classifier 603, the fourth weak classifier 604, the fifth weak classifier 605, and the sixth weak classifier 606, and hence is expressed as a non-linear mapping 607 shown on the right side in FIG. 6.

In other words, assuming that the i-dimensional elements of the training vectors satisfy the relation t1<t2<t3<t4<t5<t6 in FIG. 6, the weak classifier 601 is formed through the t1$^{th}$ learning, the weak classifier 602 is formed through the t2$^{th}$ leaning and is superpositioned on the weak classifier 601, so that the contents of the table, that is, the non-linear mapping after the t2$^{th}$ learning is determined. Subsequently, the weak classifier 603 is formed through the t3$^{th}$ learning, and is added to the non-linear mapping after the t2$^{th}$ learning to obtain a new non-linear mapping, so that the contents of the table is renewed. Six times of leaning of the i-dimensional element is eventually performed, and the weak classifiers 601 to 606 are added and the non-linear mapping 607 is recorded in the table.

Therefore, the calculation of the non-linear mapping $\phi_i(\tilde{x}\langle i \rangle)$, in which the value is renewed by the respective weak classifier, is performed only by calling and referencing the renewed non-linear mapping from the table, the calculation cost is very low.

The number of repeats of learning in AdaBoost T has no relation with the calculation of the non-linear mapping. That is, the calculation cost does not depend on the number of repeats T, and is constant because it is achieved only by referencing the non-linear mapping which is stored in the renewed table.

It is generally known that when the number of repeats of learning is increased, the performance of the classifiers is improved. Although there is an upper limit in number of repeats T from the limit of the calculation cost consumed in classification in the related art, the number of repeats T which is close to infinite so far as leaning time permits in this embodiment.

Therefore, the classification performance of the non-linear mapping obtained by this leaning is very high.

Therefore, the vector $\tilde{x}$ is non-linearly transformed by the non-linear mapping $\phi_i$ into:

$$\tilde{x} = \begin{pmatrix} \tilde{x}\langle 1 \rangle \\ \vdots \\ \tilde{x}\langle d \rangle \end{pmatrix} \mapsto \begin{pmatrix} \phi_1(\tilde{x}\langle 1 \rangle) \\ \vdots \\ \phi_d(\tilde{x}\langle d \rangle) \end{pmatrix} = \phi(\tilde{x}) \in R^d \quad (6)$$

(1-3-4) Calculating a Classification Score of a Feature Vector

The linear classification is further applied to the transformed vector $\phi(\tilde{x})$ obtained through Equation (6), so that a function of the classification score H is obtained as in the following expression:

$$H(\tilde{x}) = \mathrm{sign}\lfloor \alpha^t \phi(\tilde{x}) + b \rfloor \quad (7)$$

Then, since the normal vector a and the bias b on the linear classification plane in Equation (7) is unknown, the training vectors are substituted in sequence into Equation (7), which is a function of the classification score H in the state in which the weight a and the bias b are unknown, so that optimal weight a and the bias b are learned by the classifier integrator 18.

As is clear from Equation (2), in a classifier h obtained through AdaBoost, a=1 and b=0 are satisfied. In other cases, they are obtained also through the statistical method. In this case, the training vector is expressed by:

$$(\phi(\tilde{x}_1), \ldots, (\phi(\tilde{x}_N), y_n)$$

$$\phi(\tilde{x}) \in R^d, y = \{+1, -1\}$$

depending on the non-linear function $\phi$.

On the other hand, when SVM leaning disclosed in the aforementioned document "A Tutorial on Support Vector Machines for Pattern Recognition" for example, the vector a and the bias b which are optimal for classification are obtained.

Eventually, through the transformation of the respective non-linear mappings into:

$$\hat{\phi} = \alpha_i \phi_i + b_i$$

considering corresponding weights $a_i$ and biases $b_i$, that is, through renewal of the values in the table, the classifier in Equation (7) is expressed by the expression:

$$H(\tilde{x}) = \mathrm{sign}\left[ \sum_{i=1}^{d} \hat{\phi}_i(\tilde{x}_i) \right] \quad (8)$$

and hence the non-linear classifier 10 may be configured only by reference of the table of the non-linear functions and its sum (that is, the classification score H). The function of Equation (8) configured by the classifier integrator 18 is used in the non-linear classifier 10, described later.

For example, it is also possible to fix to the weight $a_i=1$, and the bias $b_i=0$, and omit the classifier integrator 18. The value of the classification score H in this case corresponds to the sum of the respective elements of the transformed vector transformed by the non-linear mapping obtained by the learner 15.

(2) Non-Linear Classifier 10

Figure 7:
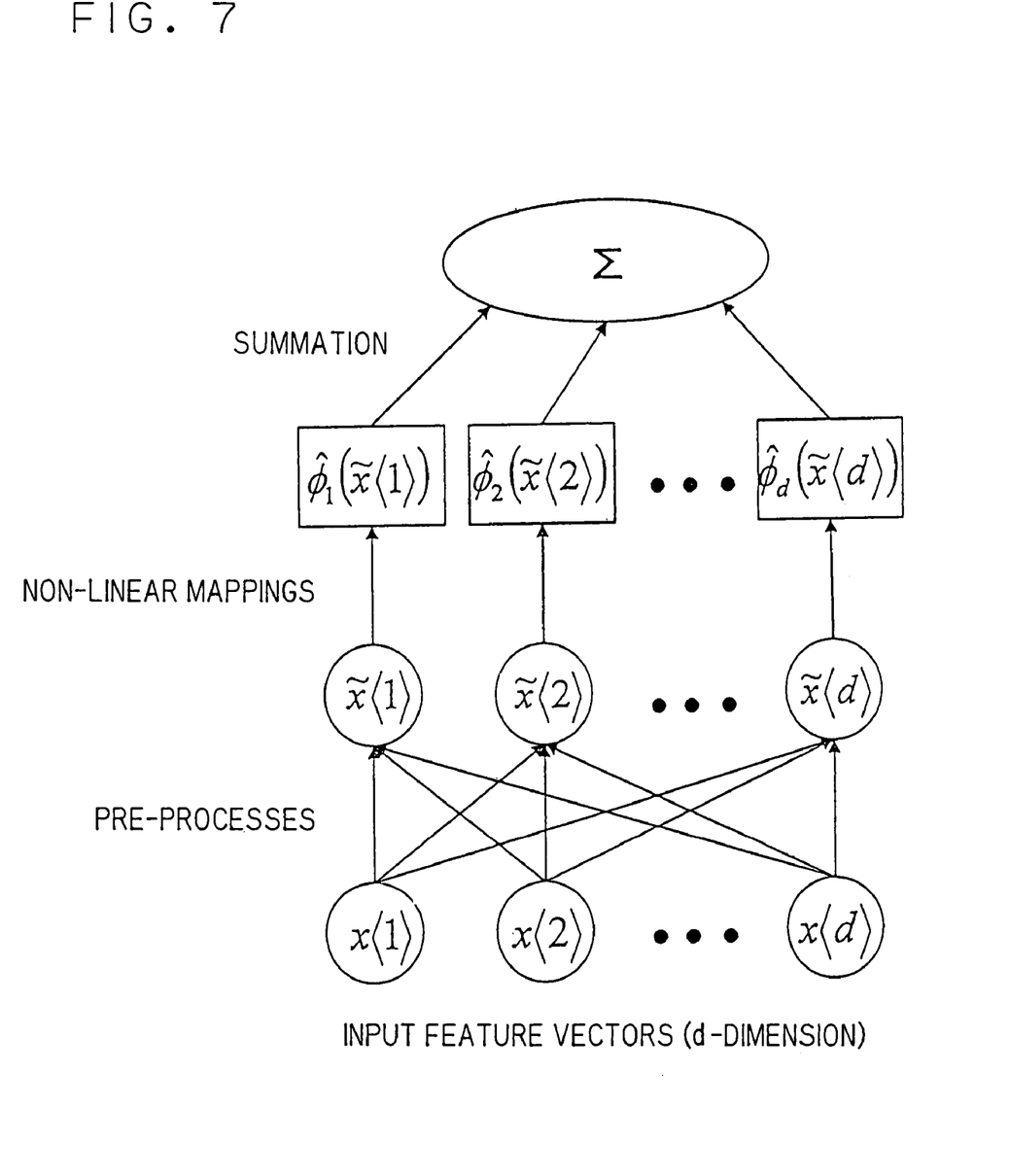
FIG. 7 is a pattern diagram of a non-linear transformation.

Subsequently, a method of recognizing by the non-linear classifier 10 on the basis of the non-linear mappings learned as described above will be described. FIG. 7 is a pattern diagram of a process of the non-linear classifier 10.

(2-1) Test Input Unit 12

The test vector x<i> to be recognized in this embodiment is supplied to the test input unit 12. The test vector x<i> is d-dimension as the training vector x.

(2-2) Pre-Processor 14

The pre-processor 14 obtains $\tilde{x}$<i> through the same process as the pre-process in the learning method shown above.

In other words, whether no process is performed as the pre-process or the statistical process, such as principal component analysis or independent component analysis, is selected.

(2-3) Non-linear Transformer 19 and Score Calculator 20

The Non-linear classifier 10, which is consists of a non-linear transformer 19 and a score calculator 20.

A result of classification is obtained by performing non-linear mappings to $\tilde{x}$<i> in Equation (6) and the calculation method of the classification score H in Equation (8) obtained by the learner 15. In other words, in the non-linear transformer 19, the test vector is substituted into Equation (6) which is a non-linear mappings and then, in the score calculator 20, the results are substituted into Equation (8) which is a function of the classification score H in which the weight a and the bias b are determined, so that the value of the classification score H of the test vector x<i> is obtained. Then, the result of classification is obtained by using the value of the classification score H.

Calculation of a non-linear mapping $\tilde{\phi}$ in Equation (6) is performed by referencing the non-linear mappings of the respective dimensions stored in the table which is eventually renewed through the leaning procedure shown as in FIG. 5. Therefore, the calculation cost of the non-linear classifier 10 is O (d) when the pre-processing is not performed. This is equivalent to the calculation cost of the linear classifier, and the classification performance of the classifier is equivalent to the non-linear classifier by the Boosting, e.g. AdaBoost, as described in the learner 15 of the non-linear mapping through Boosting.

(3) Modification

The invention is not limited to the above-described embodiment, and may be modified variously without departing the scope of the invention.

For example, in the above-described embodiment, AdaBoost described in "A decision-theoretic generalization of on-line learning and an application to boosting," is exemplified in the description of the learner 15. However, the non-linear mapping may be obtained also through "real AdaBoost" described in "Improved Boosting Algorithms using confidence-rated predictions". The "real AdaBoost" does not determine whether or not the weak classifier exits in the range as Equation (1), but realizes the weak classifier by allocating values to the respective ranges S after dividing the range as in Equation (4), so that the superposition in Equation (5) may be performed naturally.

Although AdaBoost targets two classes in the embodiment described above, the non-linear functions may be obtained in the same manner for a plurality of classes by applying Joint Boosting in "Sharing Features: efficient boosting procedures for multiclass object detection" using the weak classifier in Equation (1).

What is claimed is:

1. A recognizing apparatus comprising:
a memory storing a computer program; and
a computer executing the computer program to perform a method, the method comprising:
   receiving training vectors as feature vectors for training;
   generating weak classifiers based on the value of an element of a dimension common to the training vectors using a learning method of Boosting, the weak classifiers each classifying the training vectors based on an element of each dimension of the training vectors;
   combining the weak classifiers to obtain non-linear mappings for each dimension of the training vectors;
   receiving a test vector to be classified;
   transforming the values of the test vector using the respective non-linear mappings corresponding to the dimension of the element test vector to obtain a transformed vector; and
   summing the value of the respective elements of the transformed vector to obtain a classification score and recognizing the test vector using the classification score.

2. The apparatus according to claim 1, wherein:
generating weak classifiers further comprises learning a weighting factor for obtaining the classification score using the training vectors; and
summing comprises obtaining a weighted sum according to the weighting factor of the elements of the respective dimensions of the transformed vectors as the classification score.

3. The apparatus according to claim 1, wherein the method comprises storing the non-liner mappings in the memory, and updating the non-liner mappings by combining a new weak classifier and the non-linear mappings when the new weak classifiers are obtained.

4. The apparatus according to claim 1, wherein the method comprises performing the learning method of Boosting after a statistical process with respect to the training vectors.

5. The apparatus according to claim 1, wherein summing comprises weighted-summing to obtain the classification score.

6. The apparatus according to claim 5, wherein learning the weighting factor comprises learning the weights of the non-linear mappings of the respective dimensions statistically.

7. A recognizing method comprising:
entering a plurality of training vectors as feature vectors for training;
obtaining a plurality of weak classifiers based on the value of an element of a dimension common to the plurality of training vectors using a learning method of Boosting, the plurality of weak classifiers each classifying the plurality of training vectors based on an element of each dimension of the plurality of training vectors;
obtaining non-linear mappings for each dimension of the plurality of training vectors by combining the plurality of weak classifiers;
inputting a test vector to be classified;
obtaining a transformed vector by transforming the values of the elements of the test vector using the respective non-linear mappings corresponding to the dimension of the element; and
obtaining a classification score by summing the value of the respective elements of the transformed vector and recognizing the test vector using the classification score.

* * * * *